May 31, 1960 R. C. MEYER 2,938,731

TAPE RECORDERS

Filed June 27, 1957 2 Sheets-Sheet 1

INVENTOR
Richard C. Meyer
BY
Mason + Mason
ATTORNEYS

INVENTOR
Richard C. Meyer
BY
Mason + Mason
ATTORNEYS 2,938,731

TAPE RECORDERS

Richard C. Meyer, Guggachstrasse 42, Zurich 57, Switzerland

Filed June 27, 1957, Ser. No. 668,516

Claims priority, application Switzerland June 29, 1956

16 Claims. (Cl. 274—11)

The present invention relates to tape recorders of the kind in which the recording extends transversely across the tape and in which a sound head wheel rotates transversely relative to the direction of movement of the tape and has at least two sound heads disposed at regular intervals around the periphery of the wheel. The tape feed device is arranged so to guide the tape past the rotating sound head wheel that the individual sound heads successively pass over, at most, the entire width of the tape.

Recorders of the aforesaid kind are known, but they have not to my knowledge been successfully applied in practice for various reasons. Their advantage resides in that the tape is much more fully utilized than in the case of longitudinally recording tape recorders, since in the latter the tape width is determined primarily by the required strength of the tape, while the actual track width is substantially smaller and in conventional recorders only amounts to a small proportion of the entire tape material. The tape is much more fully utilized in the case of transversely recording instruments if the individual tracks can be positioned very close together. For this purpose, however, a feed device operating with great precision is required in order that the tape may not shift more than a fraction of one track width even when played for relatively long times. For this purpose, complicated multistage gearings have hitherto been employed, but on the one hand these have not fully satisfied the requirements and on the other hand they have so increased the cost of the instrument that such tape recorders could be employed only in a few special cases.

According to my invention there is provided a tape recorder in which the recording is adapted to extend transversely across the tape, comprising a tape feed device, and a sound head wheel rotatable transversely relative to the desired direction of movement of the tape and having at least two sound heads disposed at regular intervals around the periphery of the wheel, the feed device being adapted to guide the tape past the rotating sound head wheel so that the individual sound heads successively pass over at most the entire width of the tape, said tape feed device consisting of a friction feed wheel which is formed with a number of recesses for co-operation with a driving worm which is arranged to rotate integrally with the sound head wheel so that a constant relation exists between the rotation of the friction wheel and that of the sound head wheel, and a presser roller adapted to act on the friction wheel with the tape travelling between the two.

Several embodiments of the subject of the invention are illustrated, by way of example only, in the accompanying drawings, in which:

Figure 1 shows a sound tape having sound tracks extending transversely relative to the direction of feed of the tape, Figure 2 shows a sound head wheel comprising three sound heads and a presser shoe bearing thereon, Figure 3 is a cross-section through the illustration of Figure 2, Figure 4 is a diagrammatic illustration of a tape recorder, incorporating my invention, Figure 5 is a section through a tape feed device in a direction transverse to the tape feed direction.

Figure 1:
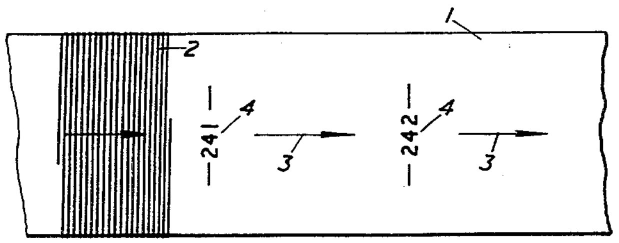

Referring now to Figure 1, this shows a sound tape 1 played transversely in relation to the direction of feed of the tape and comprising spaced magnetic tracks 2. The feed direction is indicated by the arrows 3. Preferably, time marks as shown at 4 are provided on the recording tape.

The production of such tracks will be explained by reference to Figures 2 and 3. Mounted on a shaft 7 is a sound head wheel 5, on which three sound heads 6 are disposed at regular intervals around the periphery, in such manner that the active air gaps of the so-called "balanced-ring" heads lie exactly on the pitch lines. The arc length of the pitch must not be greater than the width of the tape. The sound heads 6 project slightly beyond the guide disc 5*a* of the sound head wheel 5, the arc of contact being concentric with the axis of the shaft 7. The tape 9 extends in the direction of the axis of the shaft 7 and is pressed against the periphery of a sound head wheel 6 by means of a presser shoe 8. The sound heads 6, which are identical to one another and which have equal recording and play-back frequency response curves, are connected in series or in parallel and are connected through a slip ring system to a recording amplifier, so that they all produce the same alternating fields at the same time. When the shaft 7 rotates and the tape 1 is at the same time positively and uniformly fed in the axial direction, the rotating sound heads 6 produce the tracks designated by 2 in Figure 1, which can also be experimentally rendered visible. Each track is produced by one of the sound heads 6, and since the sound heads 6 are identical to one another the recording process can be reversed, and in fact the play-back process is only slightly different from recording.

Figure 2:
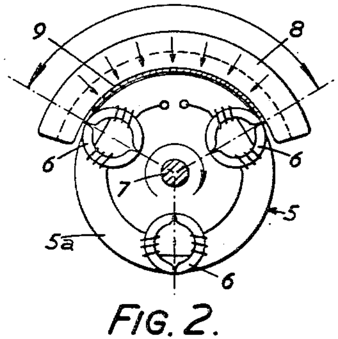
Figure 3:
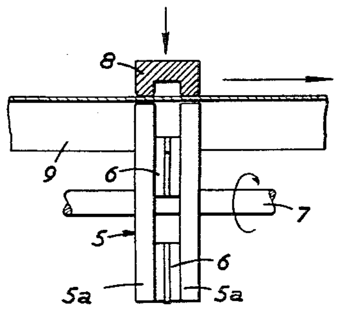
Figure 4:
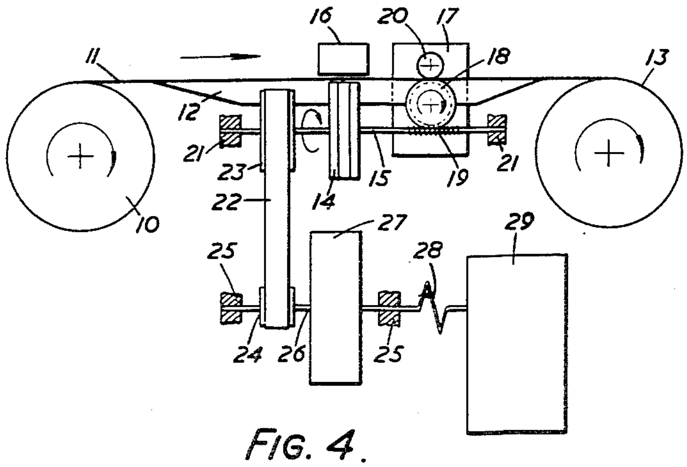

Figure 4 illustrates diagrammatically the principle of the construction of a sound recorder for recording transversely on the tape and which may incorporate a sound head wheel and presser shoe of the form shown in Figure 2.

The tape 11 is fed from a supply reel 10 through the instrument to a take-up reel 13. The tape 11 is curved at 12 by means of a suitable device whilst passing through the instrument and is returned into the flat position necessary for winding before reaching the spool 13. The tape is pressed by means of a presser shoe 16 against the sound head 14, which is mounted on the rotating shaft 15 supported in bearings 21. The positive feed movement of the tape is effected by the feed mechanism 17 and consists in principle of a worm 19 mounted on the shaft 15 and engaging in recesses in a friction wheel 18. The tape 11 is pressed against the friction wheel 18 by means of a roller 20 and during the rotation of the worm 19 receives a feed movement produced by friction and corresponding to the pitch of the helical lines designated by 2 in Figure 1. The shaft 15 carries on its lefthand end a pulley 23, over which an endless belt is guided. This belt 22 is stretched over a pulley 24 situated on the second shaft 26 and transmits the rotational movement of the shaft 26. The shaft 26 is supported in the bearings 25 and carries a flywheel mass 27, which serves to stabilize the rotational drive from the motor unit 29. The motor unit 29 consists, for example, of a synchronous motor having a reduction gearing and supplies a motion whose non-uniformity depends upon the inaccuracy of the reduction gearing. The inequalities are balanced out by the flywheel 27 which is mounted on the shaft 26 and which is connected to the motor unit 29 by means of a flexible coupling 28.

Figure 5:
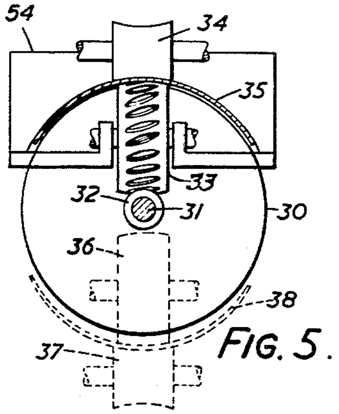
Figure 6:
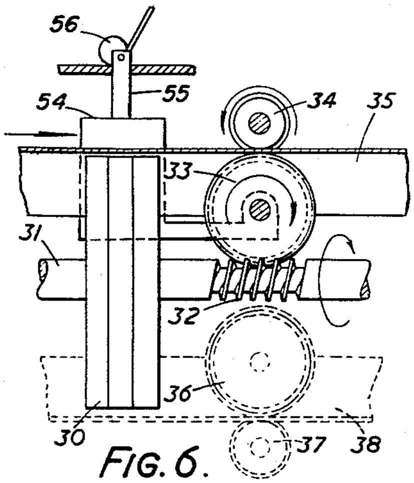
Figure 6 is a cross-section through the view of Figure 5.

A practical construction of feed mechanism for such a recorder is illustrated in Figures 5 and 6 and consists of a worm 32 on the shaft 31 and a friction wheel 33 formed with recesses, which is in engagement with the worm and against which the tape 35, pre-curved in arcuate form, is pressed by means of the roller 34. The conversion of the rotational movement of the friction feed wheel 33 into a feed movement of the tape is effected by surface friction between the friction wheel 33 and the rough undersurface of the tape.

Figures 7, 8, 9, 10, 11:
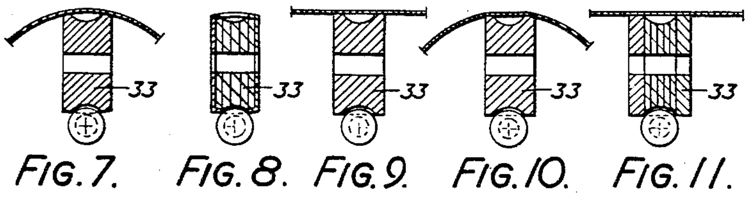
Figures 7 to 11 show various possible constructional forms of friction feed wheels.

Figures 7 to 11 show various possible constructional forms of the friction wheel 33. Figure 7 shows a friction wheel which is of barrel-like form in section, the radius of curvature of the friction wheel being equal to the radius of curvature of the tape 35 (Figure 5). The friction feed wheel consists of a material which has a low co-efficient of friction relative to that of the worm material. The tooth form of the worm is such that as little as possible of the rubbing surface of the friction wheel is used, and in addition a compact friction edge is provided on both sides. Figure 8 shows a similar construction, with the difference that an inner portion, consisting of a dry friction material, such for example as tetrafluoroethylene (Teflon) or polytrifluorochloroethylene (Kel-F) is surrounded by an outer friction jacket. Figure 9 shows a cylindrical construction which may be employed either in the flat portion of the tape or in the curved portion illustrated in Figure 10. Figure 11 shows a further friction wheel in which a central portion consists of a materal having a low coefficient of friction relative to that of the worm material and is surrounded by two friction discs which have a high coefficient of friction relative to that of the undersurface of the sound tape.

The described feed mechanism has a number of substantial advantages. In the first place, the tape can be turned back with the recorder in operation by bringing the friction wheel 36 out of engagement with worm 32, as shown in chain-lines at the bottom of Figures 5 and 6. Since the friction wheel 36 is then freely rotatable, it can be rotated in the opposite direction by means of suitable devices such as the spindle of the roller 37. The tape 38, which is thrust against the worm wheel by means of the roller 37 which is also raised, can thus be pushed in the opposite direction under the lifted presser shoe (not shown) over the sound head wheel 30. After a certain number of lines, the gearing can be re-engaged, whereafter the tracks are automatically repositioned on the sound heads wtihout any further lateral displacement. This feature is extremely important for dictating machines, since the last part can be repeated and corrected during dictation.

The tape feed wheel, for example 33, may be lifted from the worm 32 simultaneously with the lifting of the presser shoe 54 from the tape 35 by means of a linkage 55 interconnecting the feed wheel 33 and presser shoe 54, the linkage being raised by means of a cam lever 56.

A further advantage of the described drive for dictating machines resides in the possibility of simultaneously recording on two tapes in the same instrument, one tape being situated at the top and the other at the bottom, as illustrated in solid lines and chain lines in Figures 5 and 6. This makes it possible to produce two equivalent recordings in a dictating machine, one of which can be dispatched while an equivalent copy can be kept at the same time. In addition, such a double mechanism can be changed over as required simply by lifting the friction feed wheels.

In contrast to the mechanism illustrated in Figure 6, the tape can also be pushed past the rotating sound head, since the longitudinal curvature of the tape affords sufficient rigidity. In this case, the driving friction wheel lies in front of the sound head wheel as seen in the direction of feed. The cutting of short recordings on dictating machines is thereby facilitated.

Figure 12:
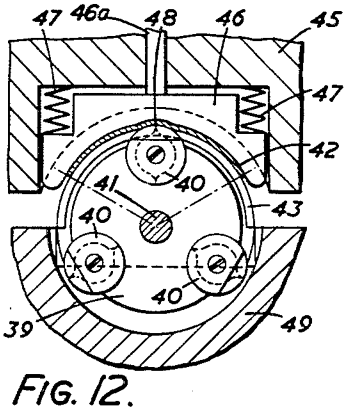
Figure 12 shows a further possible constructional form of the sound head wheel with presser shoe.
Figure 13:
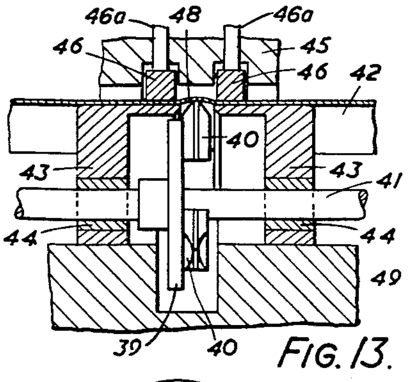
Figure 13 is a cross-section through the illustration of Figure 12.

Figures 12 and 13 show another possible construction of presser shoe and sound head wheel. The function of the presser shoe is to press the sound tape with the necessary pressure against the active face of the sound head, and this is effected in the following manner in the illustrated mechanism. Mounted on the shaft 41 is a sound head wheel 39, the diameter of which is smaller than the contact diameter of the sound heads 40. The position of these sound heads is similar to that shown in Figure 2. The sound heads, however, are arranged in cantilever fashion and their cross-section tapers upwards at the point of contact with the tape 42. The shaft 41 is mounted in two bearing bushes 44. The guide members 43 are so designed that their outer faces of contact with the tape 42 are exactly concentric with the arc of contact of the sound heads 40 with the tape 42 and are somewhat smaller in diameter. For reasons of manufacture, it is advantageous to design these guides 43 at the same time as bearings for the shaft 41, since this ensures concentricity of the circles during working. These two guides 43 are mounted on a common base 49. The sound tape 42 is drawn over these guides in pre-curved form and pressed lightly against them by means of the independent presser shoes 46 and by means of the springs 47. The presser shoes 46 have a somewhat larger radius of curvature than the guides 43 and are mounted close to the plane of contact of the sound heads. Their common mounting 45 holds the presser shoes 46 at a constant distance apart. As the sound heads 40 travel through, a slight curvature 48 is produced in the pressed-on sound tape by the fact that they project beyond the guides 43. The resultant reaction produces the necessary pressure of the tape against the sound heads. Stems 46*a* extend upwards from presser shoes 46 through the mounting 45 to connect with means for simultaneously lifting the presser shoes and tape feed wheel substantially as shown in Figure 6.

Figure 14:
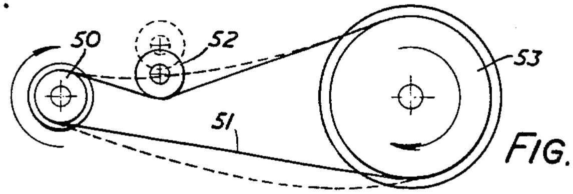
Figure 14 shows a device for the mechanical transmission of the rotation to the shaft of the sound head wheel.

Figure 14 shows in greater detail the transmission of the rotational movement from the shaft 26 to the shaft 15 as indicated in Figure 4. The endless homogeneous belt 22 is guided over the rollers 23 and 24. A tension roller 52 permits optional tensioning and slackening of the belt. This arrangement has a number of important advantages. The non-uniformities produced in the movement by the reduction gearing, known in the art as "wow or flutter," must be filtered out before the transmission to the sound head wheel. Such a flywheel filtering gives rise to considerable difficulties in the case of slow-running transverse tape recording machines if, as heretofore, this filtering is carried out directly at the sound head wheel. For this purpose, in the known machines, the slow-running sound head wheel is driven through a flexible coupling and is provided with a flywheel mass of predetermined large dimensions. Alternatively, the sound head wheel drives by means of its periphery and through a friction transmission a correspondingly smaller, but more rapidly rotating, flywheel mass. Such methods have serious disadvantages, which can be conveniently overcome by the arrangement illustrated in Figure 14, whereby the mechanism is made substantially wear-free, reliable and compact. The use of a tension roller also makes it possible to engage and disengage the recording mechanism in a satisfactory manner as required during operation of the drive.

What I claim is:

1. In a tape recorder, a rotatable sound head wheel, a plurality of sound heads spaced apart around the periphery of said wheel, means for rotating said sound head wheel, tape feed means for moving a tape past said sound head wheel in a direction transverse to the direction of rotation of said sound head wheel, pressure means for pressing the portion of tape presently adjacent said sound head wheel into engagement with that one of said sound heads which is mounted on that portion of the periphery of said sound wheel presently adjacent the tape, said tape feed means comprising a friction feed wheel, said friction feed wheel having a periphery with a number of recesses in said periphery, a driving worm, said worm being in driving engagement with said peripheral recesses and being connected to said sound head wheel for rotation therewith whereby a predetermined relationship exists between the rotation of said friction feed wheel and the rotation of said sound head wheel, a pressure roller mounted adjacent said friction wheel, said pressure roller being adapted to press a portion of the tape into driving engagement with said friction wheel means for effecting selective lifting of said friction feed wheel from said worm for disconnecting the drive to said feed wheel and means for rendering said pressure means ineffective to press tape against said sound heads, such means being operated simultaneously with said means for effecting selective lifting of the friction feed wheel from the worm.

2. A tape recorder according to claim 1, wherein the surface of said friction feed wheel which contacts the tape has uniform outward curvature.

3. A tape recorder according to claim 1, wherein said friction feed wheel consists of a material which has a low coefficient of friction relative to the coefficient of friction of the material from which said driving worm is formed.

4. A tape recorder according to claim 3, wherein the surface of said friction feed wheel which contacts the tape is coated with a material having a high coefficient of friction relative to the coefficient of friction of the undersurface of the tape.

5. A tape recorder according to claim 1, wherein said pressure roller is deformable to adapt itself to the shape of the portion of said friction feed wheel on the opposite side of the tape.

6. A tape recorder according to claim 1, wherein said friction feed wheel consists of a central portion and two lateral friction discs, said central portion having a low coefficient of friction relative to the coefficient of friction of said worm, said lateral friction discs being positioned one on each side of said central portion and consisting of a material whose coefficient of friction is high relative to the coefficient of friction of the undersurface of the tape.

7. A tape recorder according to claim 1, further comprising a shaft, both said sound head wheel and said driving worm being mounted on said shaft for rotation therewith.

8. A tape recorder according to claim 1, wherein a second friction feed wheel and associated pressure roller are provided, said second feed wheel being of the same construction as said first mentioned feed wheel and having its peripheral recesses in driving engagement with said worm, the two feed wheels being mounted on opposite sides of said worm whereby separate tapes may be drawn past opposite sides of said sound head wheel.

9. A tape recorder according to claim 1, further comprising means for rotating the lifted friction feed wheel in the opposite direction to which it is rotated by said worm.

10. A tape recorder according to claim 1, wherein said means for rotating the sound head wheel consists of a driving motor, a first driving shaft, a first pulley mounted on said first driving shaft, a flywheel mass, said flywheel mass being mounted on said first driving shaft, a flexible coupling member, said flexible coupling member coupling said first driving shaft in driven engagement with said motor, a second driving shaft on which said sound head wheel is mounted, a second pulley mounted on said second driving shaft, and an endless homogeneous belt coupling said first and second pulleys.

11. A tape recorder according to claim 1, further comprising two fixed guide surfaces, said guide surfaces being curved uniformly in a direction transverse to the direction of movement of the tape past the sound head wheel and being disposed one on each side of the sound head wheel concentric with the axis of rotation thereof, said sound heads projecting beyond said guide surfaces, and two independent pressure members, each pressure member being mounted opposite one of said guide surfaces respectively, the surface of each pressure member which lies adjacent a guide surface being curved and being concentric with said guide surface, and two independent resilient members, each resilient member applying pressure to one pressure member respectively for urging said pressure member towards its adjacent guide surface.

12. In a tape recorder, a shaft, said shaft being rotatable around its longitudinal axis, a sound head wheel mounted on said shaft for rotation therewith, a plurality of sound heads mounted on said sound wheel at spaced intervals around the periphery of said sound wheel, driving means for rotating said shaft, a worm mounted on said shaft for rotation therewith, a rotatable spindle, said spindle having its longitudinal axis substantially at right angles to the longitudinal axis of said shaft, a friction tape-feed wheel mounted on said spindle, said tape-feed wheel having a peripheral surface which has a number of recesses therein, said worm being in driving engagement with said peripheral recesses, a pressure roller, said pressure roller being mounted opposite said tape feed wheel for pressing recording tape into engagement with said friction tape feed wheel whereby tape is moved past said sound head wheel in a direction parallel to the longitudinal axis of said shaft, and further pressure means mounted opposite said sound head wheel for pressing the tape passing said sound head wheel into engagement with that one of said sound heads which is mounted on the portion of the periphery of said sound head wheel presently adjacent the tape means for effecting selective lifting of said friction feed wheel from said worm for disconnecting the drive to said feed wheel and means for rendering said pressure means ineffective to press tape against said sound heads, such means being operated simultaneously with said means for effecting selective lifting of the friction feed wheel from the worm.

13. In a tape recorder, a first shaft, said first shaft being rotatable around its longitudinal axis, a sound head wheel mounted on said first shaft for rotation therewith, a plurality of sound heads mounted on said sound wheel at spaced intervals around the periphery of said sound wheel, a first pulley mounted on said first shaft, a second shaft, a flywheel mass mounted on said second shaft, a second pulley mounted on said second shaft, an endless homogeneous belt coupling said first and second pulleys, a driving motor, a flexible coupling member, said flexible coupling member coupling said motor to said second shaft, a worm mounted on said first shaft for rotation therewith, a rotatable spindle, said spindle having its longitudinal axis substantially at right angles to the longitudinal axis of said shaft, a friction tape-feed wheel mounted on said spindle, said tape feed wheel having a peripheral surface which has a number of recesses therein, said worm being in driving engagement with said peripheral recesses, a pressure roller, said pressure roller being mounted opposite said tape feed wheel for pressing recording tape into engagement with said friction tape feed wheel whereby tape is moved past said sound head wheel in a direction parallel to the longitudinal axis of said shaft, the portion of the external surface of said friction feed wheel which is engaged by said worm consisting of a material having a low coefficient of friction relative to that of said worm and the portion of the external surface of said friction feed wheel which engages the tape consisting of a material having a high coefficient of friction relative to that of the surface of the tape which it engages, and further pressure means mounted opposite said sound head wheel for pressing the tape passing said sound head wheel into engagement with that one of said sound heads which is mounted on the portion of the periphery of said sound head wheel presently adjacent the tape means for effecting selective lifting of said friction feed wheel from said worm for disconnecting the drive to said feed wheel and means for rendering said pressure means ineffective to press tape against said sound heads, such means being operated simultaneously with said means for effecting selective lifting of the friction feed wheel from the worm.

14. In a tape recorder, a shaft, said shaft being rotatable around its longitudinal axis, a sound head wheel mounted on said shaft for rotation therewith, a plurality of sound heads mounted on said sound wheel at spaced intervals around the periphery of said sound wheel, driving means for rotating said shaft, a worm mounted on said shaft for rotation therewith, a rotatable spindle, said spindle having its longitudinal axis substantially at right angles to the longitudinal axis of said shaft, a friction tape-feed wheel mounted on said spindle, said tape feed wheel having a peripheral surface which has a number of recesses therein, said worm being in driving engagement with said peripheral recesses, a pressure roller, said pressure roller being mounted opposite said tape feed wheel for pressing recording tape into engagement with said friction tape feed wheel whereby tape is moved past said sound head wheel in a direction parallel to the longitudinal axis of said shaft, two fixed guide surfaces, said guide surfaces being curved uniformly in a direction transverse to the direction of movement of the tape past the sound head wheel and being disposed one on each side of the sound head wheel concentric with the axis of rotation thereof, said sound heads projecting beyond said guide surfaces, a first tape presser member mounted opposite one of said fixed guide surfaces, first resilient means urging said first presser member towards that fixed guide surface, a second tape presser member mounted opposite the second fixed guide surfaces, and second resilient means urging said second presser member towards said second fixed guide surface, the surface of each presser member which lies opposite its respective guide surface being curved and being concentric with that guide surface means for effecting selective lifting of said friction feed wheel from said worm for disconnecting the drive to said feed wheel and means for rendering said presser members ineffective to press tape against said sound heads, such means being operated simultaneously with said means for effecting selective lifting of said friction feed wheel from the worm.

15. A tape recorder according to claim 14, wherein a second friction feed wheel and associated pressure roller are provided, said second feed wheel being of the same construction as said first mentioned feed wheel and having its peripheral recesses in driving engagement with said worm, the two feed wheels being mounted on opposite sides of said worm whereby separate tapes may be drawn past opposite sides of said sound head wheel.

16. In a tape recorder, a rotatable sound head wheel, a plurality of sound heads spaced apart around the periphery of said wheel, means for rotating said sound head wheel, tape feed means for moving a tape past said sound head wheel in a direction transverse to the direction of rotation of said sound head wheel, pressure means for pressing the portion of tape presently adjacent said sound head wheel into engagement with that one of said sound heads which is mounted on that portion of the periphery of said sound wheel presently adjacent the tape, said tape feed means comprising a friction feed wheel, said friction feed wheel having a periphery with a number of recesses in said periphery, a driving worm, said worm being in driving engagement with said peripheral recesses and being connected to said sound head wheel for rotation therewith whereby a predetermined relationship exists between the rotation of said friction feed wheel and the rotation of said sound head wheel, a pressure roller mounted adjacent said friction wheel, said pressure roller being adapted to press a portion of the tape into driving engagement with said friction wheel, means for effecting selective lifting of said friction feed wheel from said worm for disconnecting the drive to said feed wheel, means for rotating the lifted friction feed wheel in the opposite direction to which it is rotated by said worm and means for rendering said pressure means ineffective to press tape against said sound heads, such means being operated simultaneously with said means for effecting selective lifting of the friction feed wheel from the worm.

References Cited in the file of this patent

UNITED STATES PATENTS

| | | |
|---|---|---|
| 2,245,286 | Marzocchi | June 10, 1941 |
| 2,577,190 | Hare | Dec. 4, 1951 |
| 2,611,284 | Albee | Sept. 23, 1952 |
| 2,666,813 | Camras | Jan. 19, 1954 |
| 2,845,495 | Lyon | July 29, 1958 |